[15] 3,636,710
[45] Jan. 25, 1972

[54] ROCKET ENGINE WITH THRUST DIRECTION MODIFYING DEVICES

[72] Inventors: Joseph J. Lovingham, Madison; Hartmann J. Kircher, III, Sparta, both of N.J.

[73] Assignee: Thiokol Chemical Corporation, Bristol, Pa.

[22] Filed: Oct. 22, 1965

[21] Appl. No.: 501,063

Related U.S. Application Data

[62] Division of Ser. No. 247,443, Dec. 18, 1962, Pat. No. 3,482,404.

[52] U.S. Cl. ................................. 60/231, 60/230, 60/232, 60/251, 60/253, 60/258
[51] Int. Cl. ........................................................... F02k 1/14
[58] Field of Search ................................ 60/35.6, 231, 230

[56] References Cited

UNITED STATES PATENTS

| | | | |
|---|---|---|---|
| 2,434,652 | 1/1948 | Hickman | 60/35.6 |
| 2,500,117 | 3/1950 | Chandler | 60/35.6 |
| 3,016,697 | 1/1962 | Sternberg et al. | 60/35.6 |
| 3,091,081 | 5/1963 | Alper et al. | 60/35.6 |
| 3,128,599 | 4/1964 | Carr | 60/35.6 |
| 3,135,089 | 6/1964 | Dryden | 60/35.6 |
| 3,145,530 | 8/1964 | Sabey | 60/35.6 |
| 3,151,446 | 10/1964 | Parilla | 60/35.6 |
| 3,173,250 | 3/1965 | Matzenauer | 60/35.6 |
| 3,192,714 | 7/1965 | Hickerson | 60/35.6 |
| 3,216,191 | 11/1965 | Madison et al. | 60/35.6 |

*Primary Examiner*—Samuel Feinberg
*Attorney*—William R. Wright, Jr.

EXEMPLARY CLAIM

1. A rocket engine comprising, in combination, a manifold for introducing propellants into a combustion chamber, a wall having a hemispherical deflecting surface fixed to an intermediate portion of said manifold and extending aft therearound, a conical combustion chamber fixed to and communicating with the aft end of said manifold and having its larger open end positioned adjacent but spaced from said surface to define an expansion exhaust nozzle and throat therewith, apertures formed in the apex of said chamber for bleeding combustion gases therethrough, and means for deflecting a portion of said gases to vary the thrust vector of said engine in operation.

17 Claims, 27 Drawing Figures

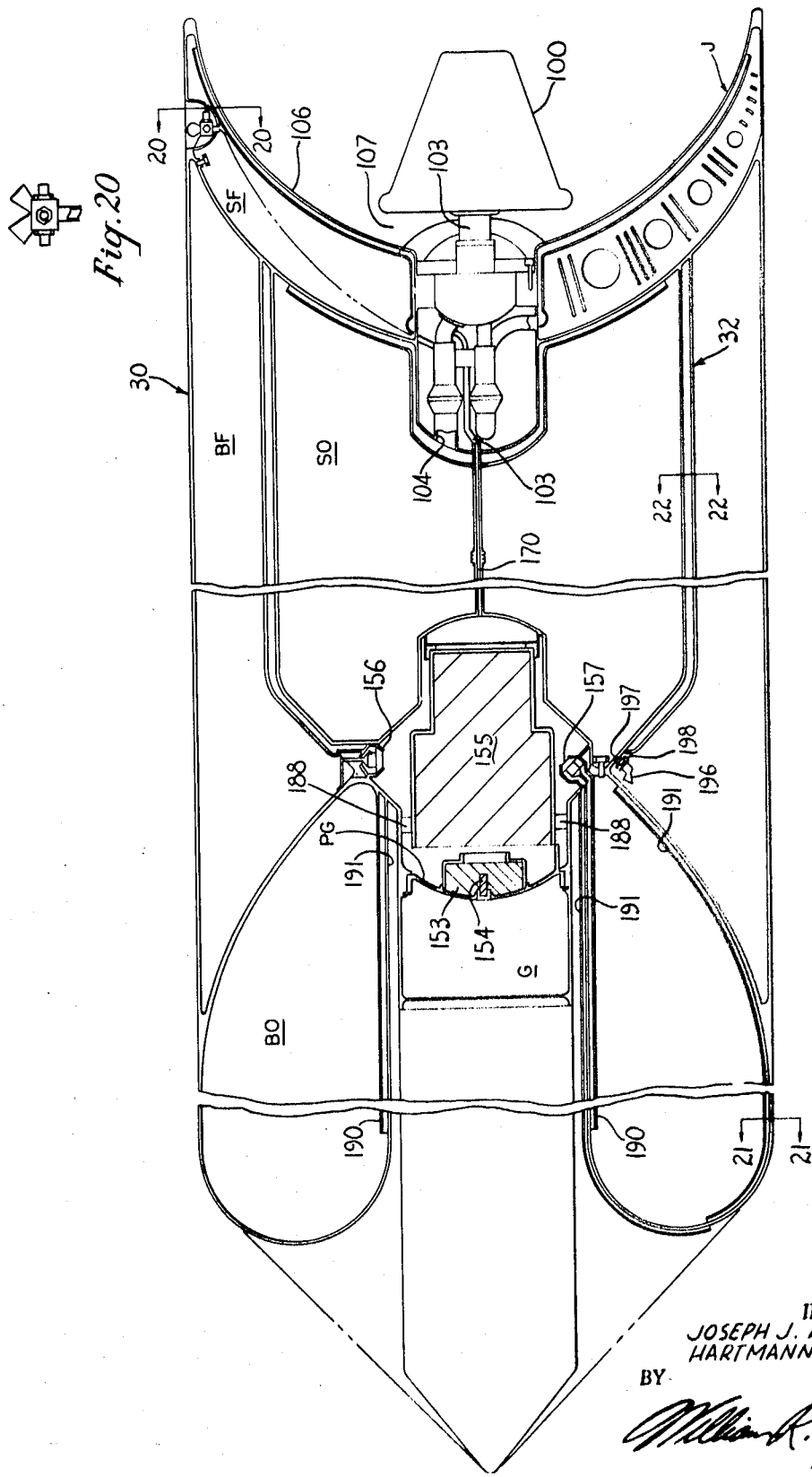

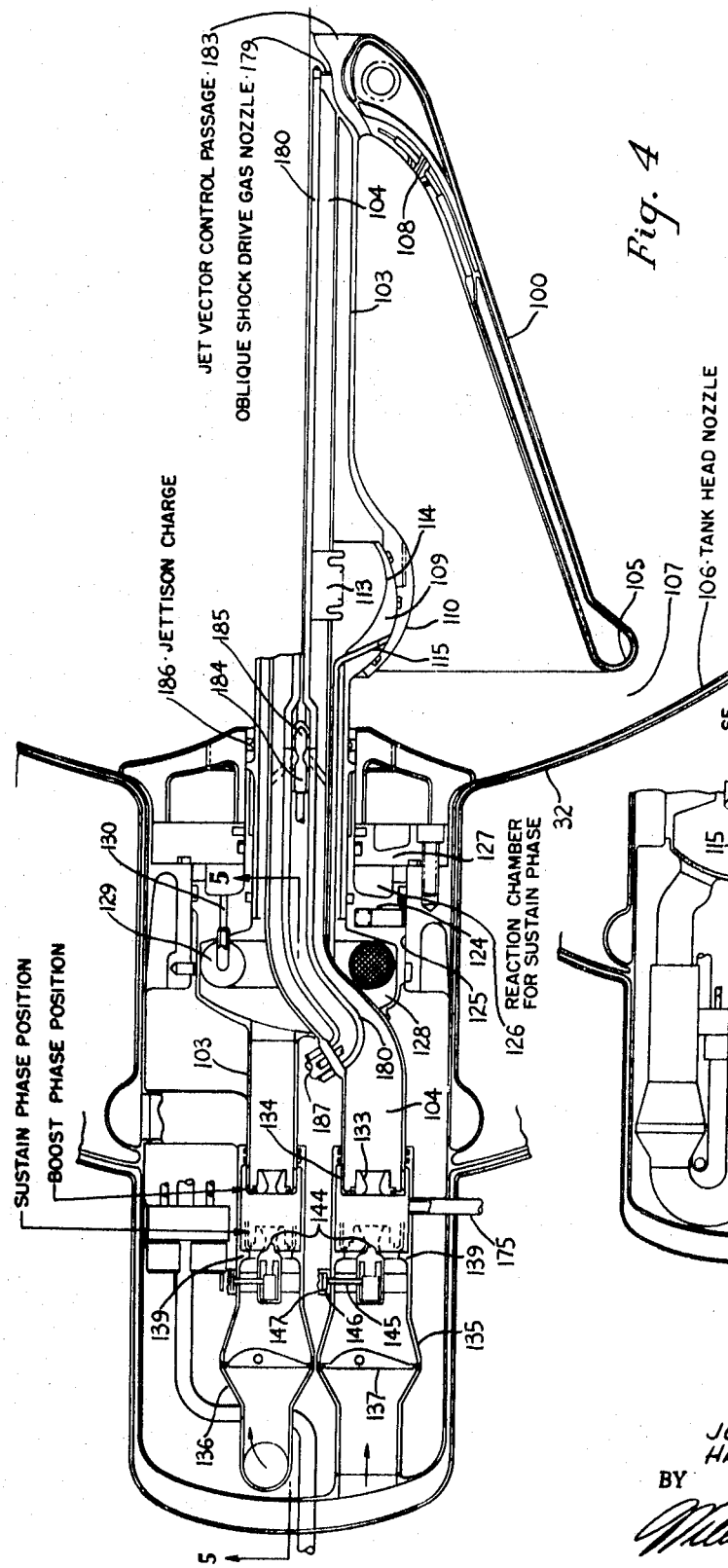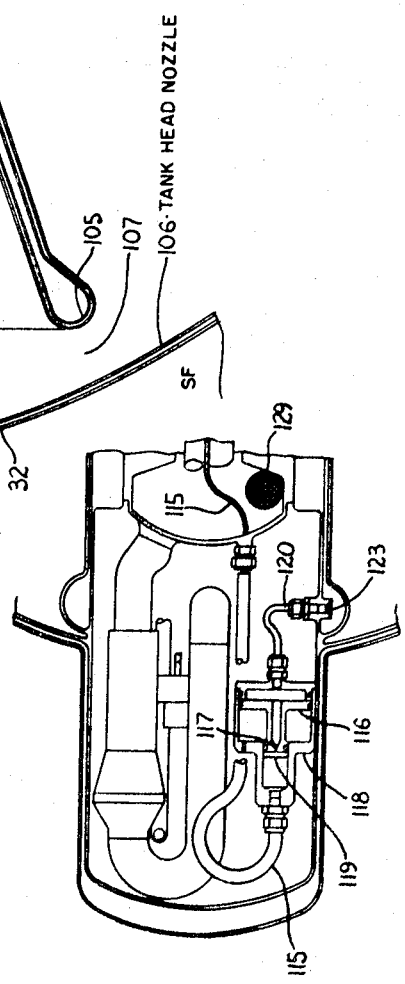
Fig. 4
Fig. 5

INVENTORS
JOSEPH J. LOVINGHAM
HARTMANN J. KIRCHER III
BY
*William R. Wright Jr.*
AGENT

66·CONTROL GAS PASSAGE

INVENTORS
JOSEPH J. LOVINGHAM
HARTMANN J. KIRCHER III
BY
*William R. Wright*
AGENT 3,636,710

ROCKET ENGINE WITH THRUST DIRECTION MODIFYING DEVICES

This application is a division of Ser. No. 247,443, filed Dec. 18, 1962, and entitled Missile and Powerplant and now U.S. Pat. No. 3,482,404, granted Dec. 9, 1969.

This invention relates generally to reaction motors and particularly to an improved rocket powerplant or missile having an improved construction and a novel type of thrust chamber.

Rocket powerplants of various types are well known in the art and most of these are characterized by at least several of a considerable number of disadvantages inherent in each of the various types. Among these disadvantages are: the use of separate thrust chambers for multistage operation; a lowered payload or fuel capacity due to the volume of the powerplant occupied by the thrust chamber; an inability to vary the thrust of the powerplant or to effect thrust vector control; the use of complicated control and/or pressurizing systems resulting in added weight and airframe space requirements; an inability to effect packaging of the powerplant; an inability to effect a termination of thrust simply and accurately; and an excessive weight, length and/or cost without resulting in a higher reliability.

Accordingly the main object of the present invention is to provide an improved, packaged, rocket powerplant having an engine with a novel type of thrust chamber and which will obviate the above and other disadvantages characterizing known prior art structures.

An important object of the present invention is to provide an improved rocket powerplant in which the volume normally occupied by the combustion chamber of the engine may be utilized for propellant loading to effect an increase in mass ratio for the missile.

Another important object of the present invention is to provide an improved rocket powerplant having a rocket engine embodying a novel thrust chamber hereinafter designated as an "acorn" thrust chamber which provides: a control of thrust level; an optimum nozzle expansion; a simple, high response, thrust vector control; efficient "packaging;" and simple, accurate thrust termination.

A further important object of the present invention is to provide an improved rocket powerplant and missile which; has a rocket engine which uses a single combustion chamber for both boost and sustain thrust; uses a single, low-temperature solid propellant gas generator for propellant feed, thrust vector control, roll control and vernier velocity control; employs jettisonable booster tanks that are separated by a liquid fueled, shaped charge system that is inert until the engine ignites; and contains the payload, guidance, etc., within the tankage, and thus affords the advantages of lower weight, shorter length, lower cost, and higher reliability, over the conventional two stage approach.

A still further important object of the present invention is to provide an improved rocket powerplant of the type described which embodies a booster tank jettison system, a safety destruct system, and which may be armed when desired by the insertion of initiators for the two systems and for the solid pressurization grain of the gas generator.

Another important object of the present invention is to provide an improved rocket powerplant having a novel engine of the type described wherein thrust vectoring during boost operation is achieved by swiveling the acorn thrust chamber about a universal joint by mechanical means or by means of combustion gases bled through the aft end of the chamber and controlled by the oblique shock technique.

A further important object of the present invention is to provide a fluid pressure balanced, universal joint pivot for the "acorn" thrust chamber of the engine so that only minimal forces are required to effect swiveling of the chamber during thrust vectoring.

A still further important object of the present invention is to provide novel means for effecting thrust vectoring of a rocket engine having a fixed acorn thrust chamber.

Another important object of the present invention is to provide a two stage, packaged, liquid propellant, powerplant having a solid propellant pressurizing system embodying automatic valves operable upon termination of the first stage to shut off pressurizing gas flow to the first stage propellant tanks and admit it to the second stage tanks.

A further important object of the present invention is to provide a two stage, packaged, liquid propellant powerplant having a propellant flow control valve assembly initially operable by propellant pressure for first stage propellant flow, then operable by pressuring gases to second stage operation, and finally operable to shut down position by spring means.

A still further important object of the present invention is to provide a novel rocket engine having a thrust chamber of conical or "acorn" shape with an open base or forward end positioned adjacent a contoured deflecting surface with which the rim of the cone or "acorn" defines an expansion nozzle for the combustion gases which burn in the "acorn."

Another important object of the present invention is to provide a missile in the form of an improved rocket powerplant which is the vehicle for a payload or warhead, and a guidance system, etc., mounted within the propellant tankage; employs jettisonable booster tanks; and is provided with a rocket engine having a single combustion chamber for both booster and sustain operational phases.

Other objects and advantages of the present invention will become apparent during the course of the following description.

In the drawings we have shown several embodiments of the invention. In these showings:

FIG. 1 is a schematic view of the novel rocket powerplant and missile comprising the present invention;

FIG. 4 is a fragmentary, central, longitudinal sectional view to an enlarged scale of the preferred form of the acorn thrust chamber and nozzle and the controls therefor;

FIG. 5 is a fragmentary similar view thereof but taken at an angle turned 90° with respect to FIG. 4;

Figure 10:
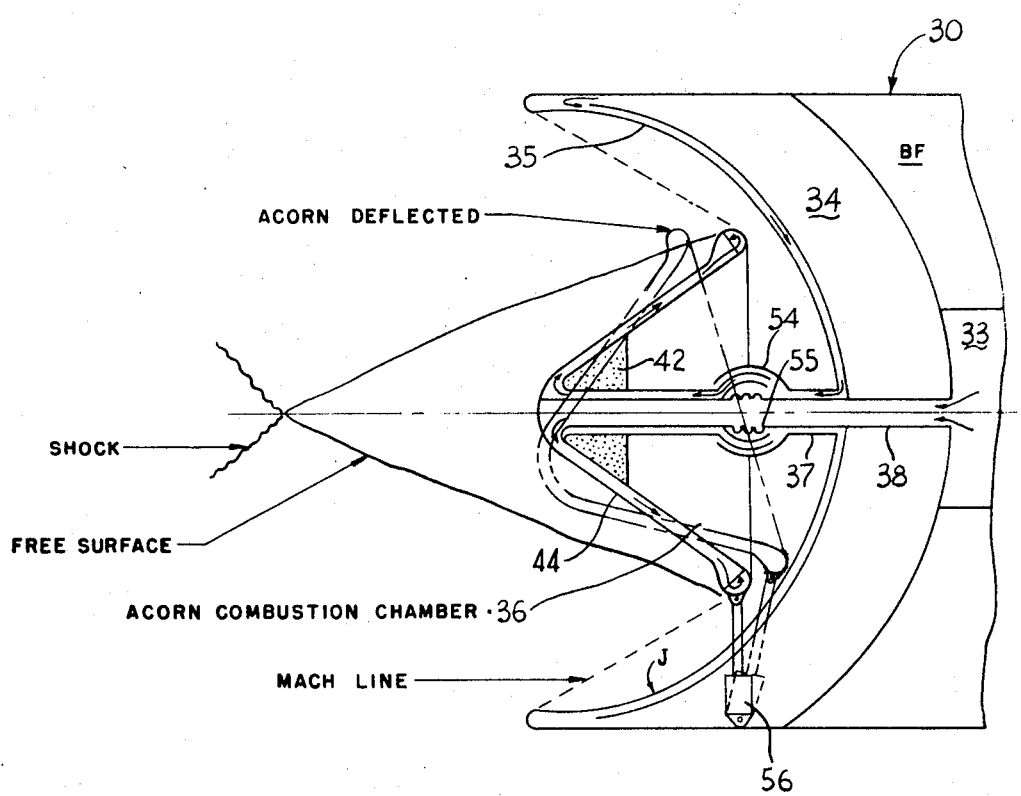
FIG. 10 is a view similar to FIG. 6 but showing the "acorn" thrust chamber and nozzle swively mounted by means of a ball joint pivot and another modification of mechanical means for effecting vector control by tilting the acorn.
Figure 12:
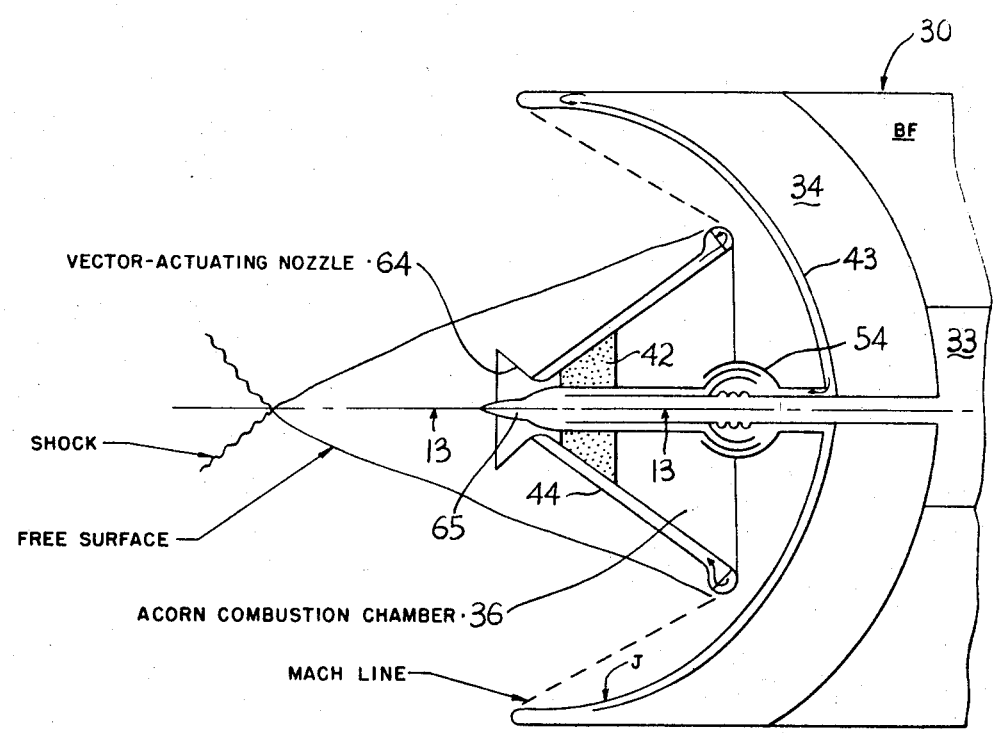
Figure 13:
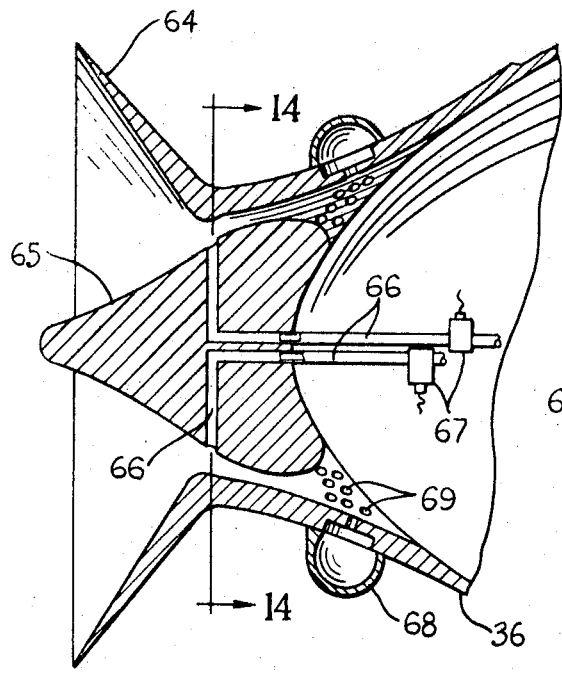
Figure 14:
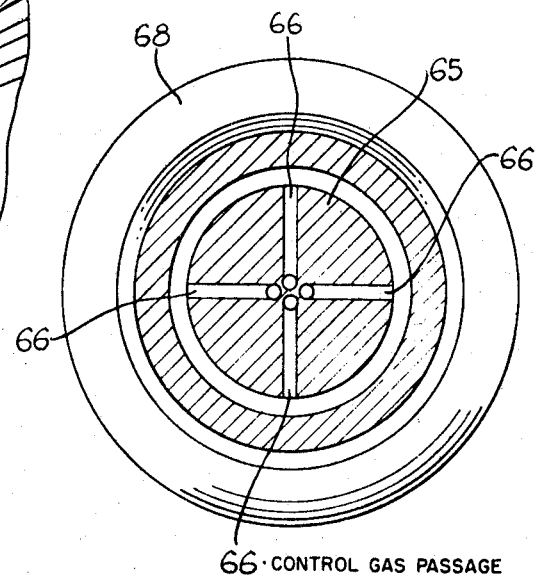
Figure 15:
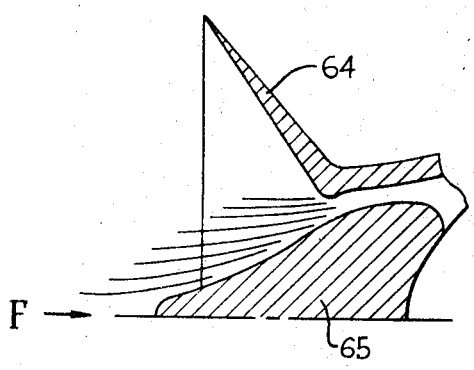
Figure 16:
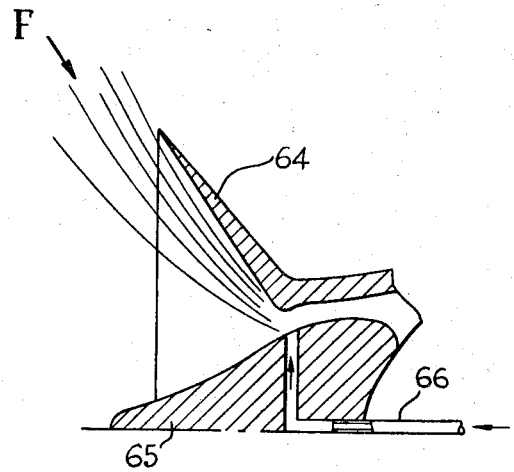
Figure 17:
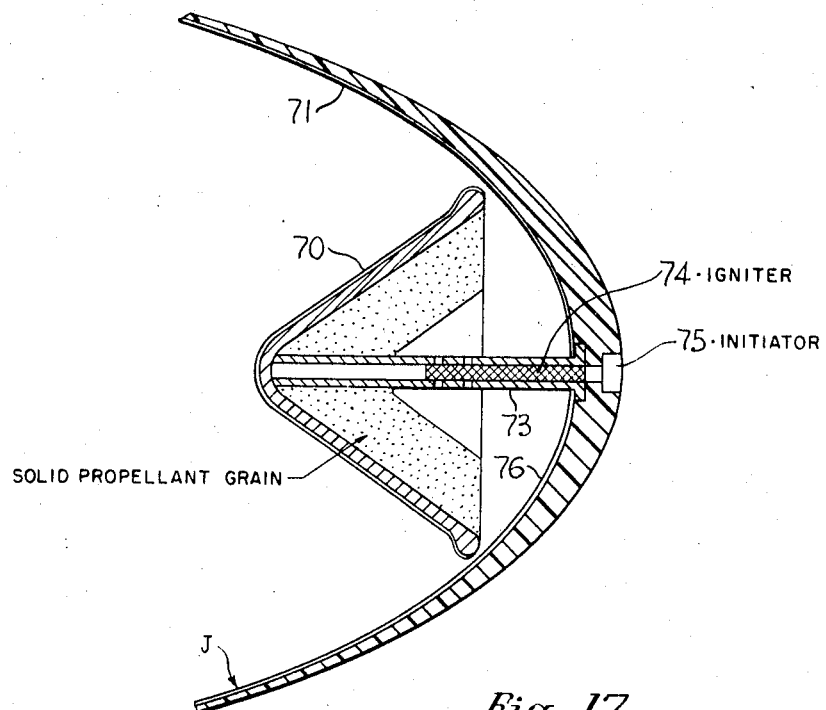
Figure 18:
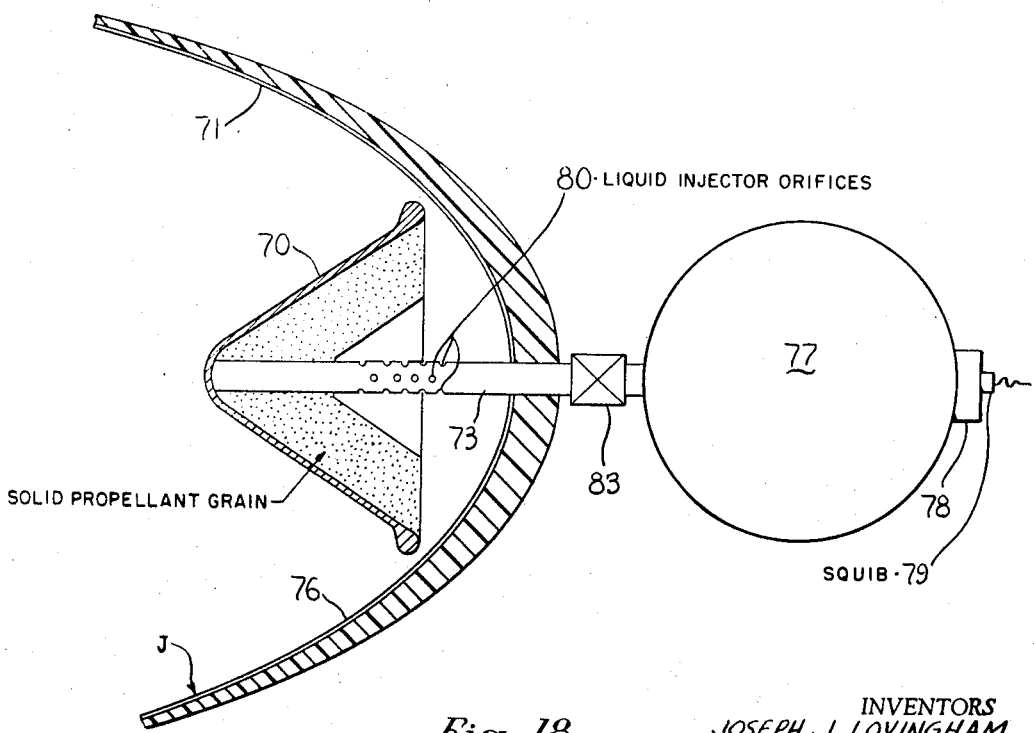
Figure 19:
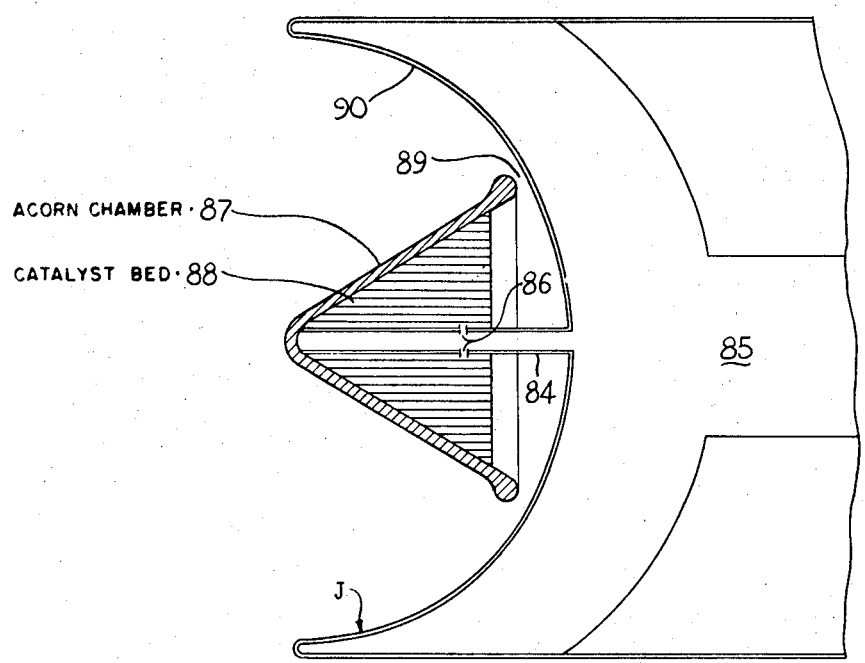
Figure 23:
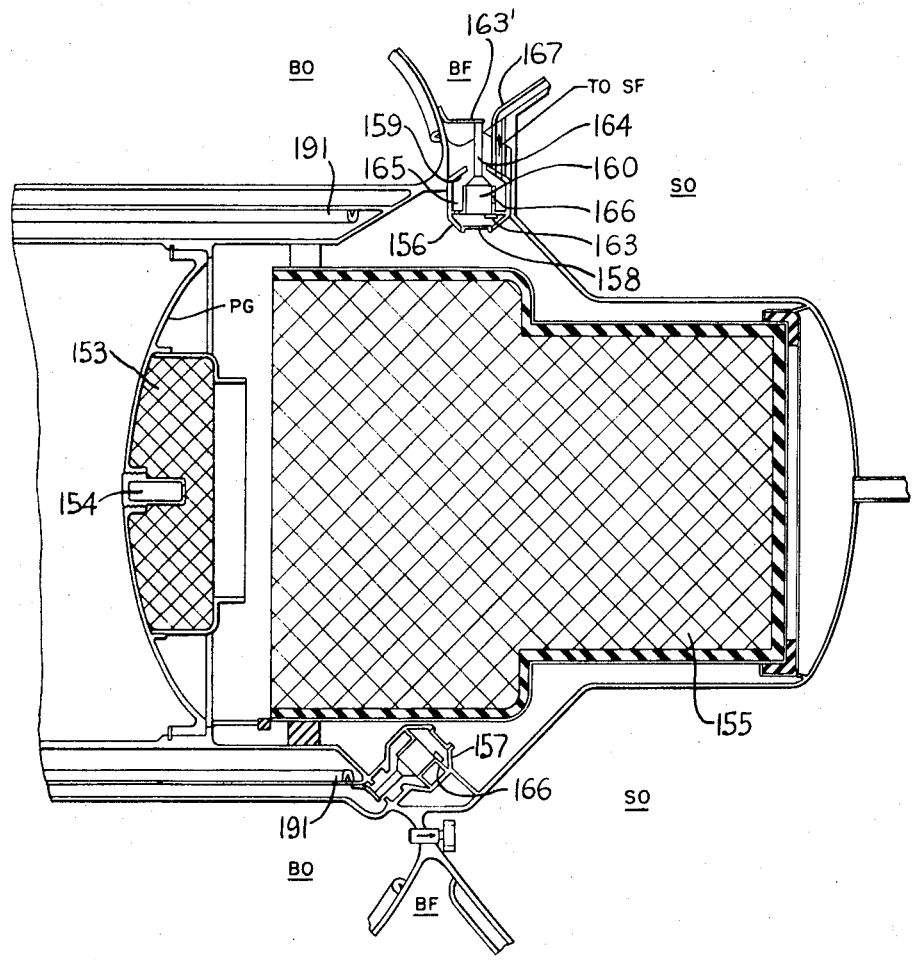
Figure 24:
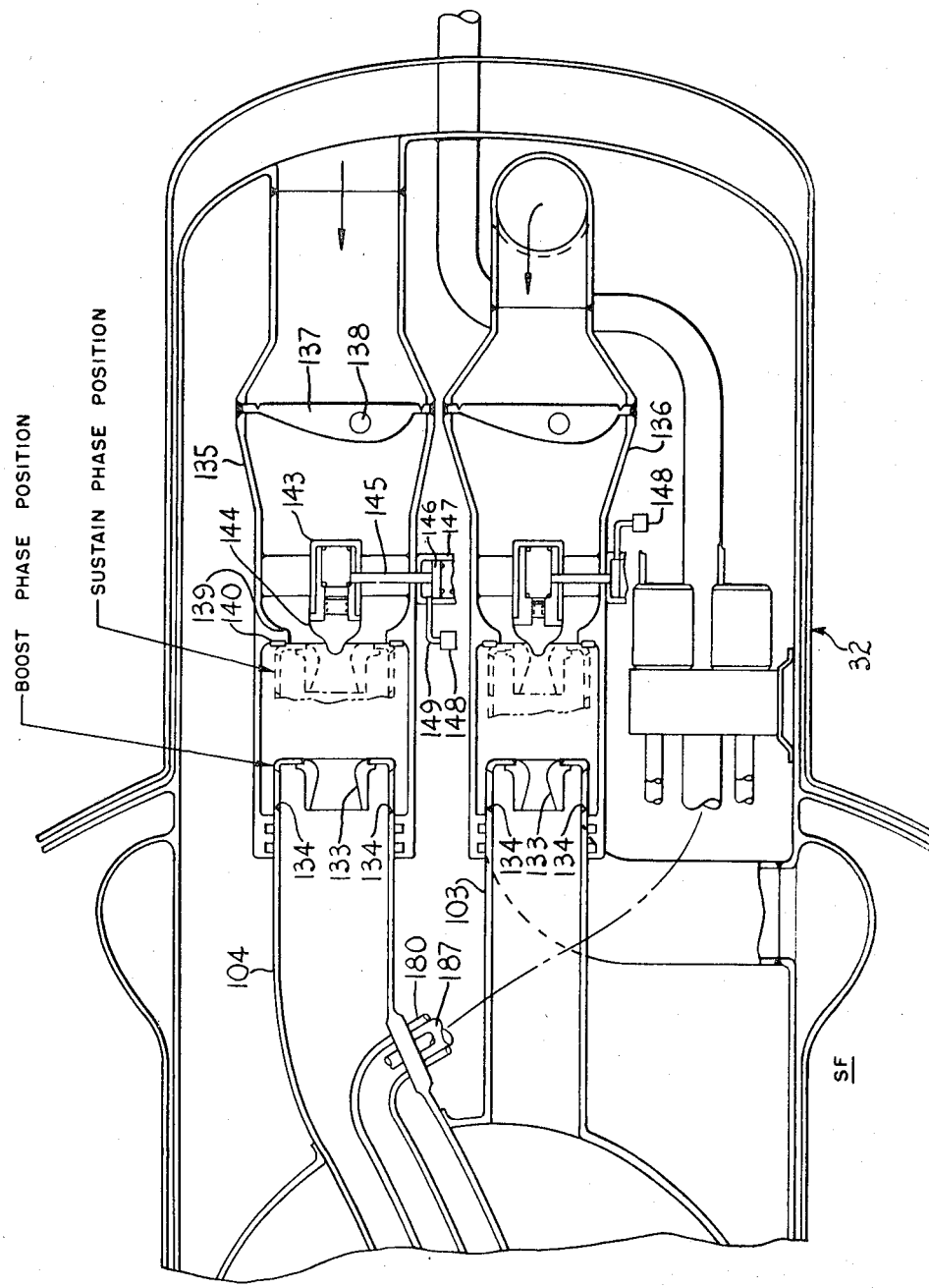
Figure 25:
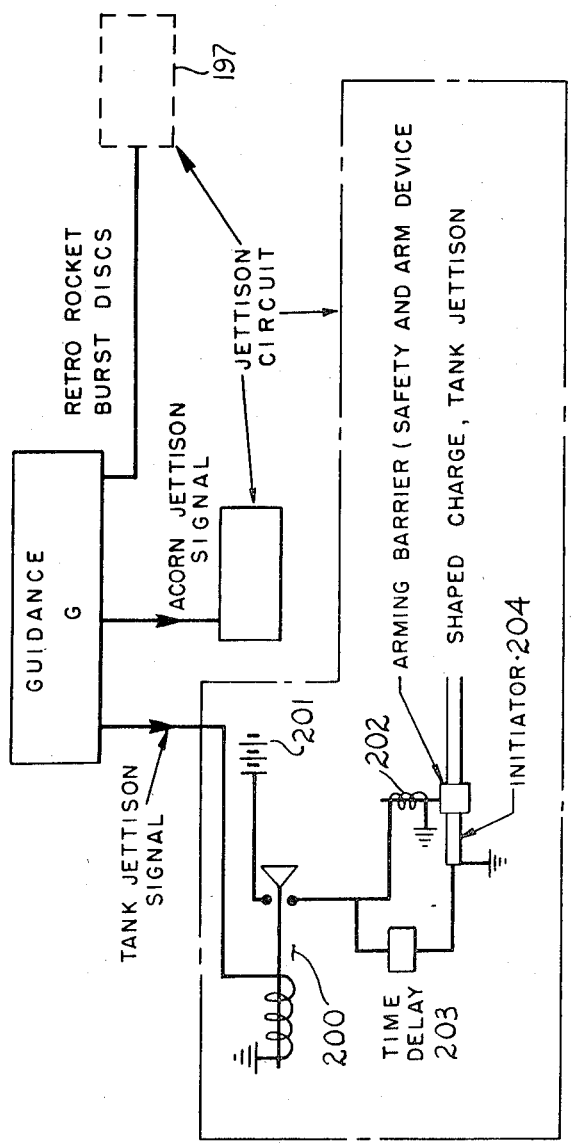

FIG. 12 is a view similar to FIG. 10 but showing the employment of aerodynamic actuation for thrust vector control, combustion gases being bled from a nozzle at the apex of the acorn rearwardly and subject to auxiliary moment producing control forces; FIG. 13 is a fragmentary sectional view to an enlarged scale of the acorn and its apex nozzle of FIG. 12 showing the means for producing the auxiliary control forces;

FIG. 14 is a transverse, sectional view thereof taken on the line 14—14 of FIG. 13;

FIG. 15 is a fragmentary schematic view showing the axial nature of the flow through the apex nozzle in the absence of control fluid forces;

FIG. 16 is a similar view showing the deflection of the apex nozzle flow under the influence of control fluid;

FIG. 17 is a central, longitudinal sectional view to a decreased scale of another form of the acorn powerplant which uses a solid propellant;

FIG. 18 is a similar view of another form of the acorn powerplant which is a hybrid using both liquid and solid propellants;

FIG. 19 is a similar fragmentary view of another form of the "acorn" powerplant which uses a monopropellant and a catalyst bed;

FIG. 20 is a transverse sectional detail view taken on the line 20—20 of FIG. 1;

FIG. 21 is a similar view taken on the line 21—21 of FIG. 1;

FIG. 22 is a similar view taken on the line 22—22 of FIG. 1;

FIG. 23 is a greatly enlarged view of the dash line encircled portion of FIG. 1;

FIG. 24 is an enlarged view of the flow control valve assembly portion of the controls shown in FIG. 4; and FIG. 25 is a schematic view of the signaling circuits for effecting the proper sequential operational steps of the powerplant.

Referring to the drawings, the preferred form of the improved missile and powerplant which is designated as a whole by numeral 30, includes a sustain fuel tank SF, a sustain oxidizer tank SO, a gas generator chamber PG, and an abutting cylindrical chamber G containing guidance controls, etc., all being rigidly connected as an airframe designated as a whole by numeral 32.

A payload P which may be a warhead, instrumentation, and/or personnel capsule, guidance, etc., is releasably mounted on the forward end of the chamber G and enclosed by annular, jettisonable boost oxidizer and boost fuel tanks BO and BF respectively which are rigidly connected to each other and to the airframe 32. The boost oxidizer and boost fuel tanks are automatically jettisoned upon conclusion of boost operation phase (FIG. 2) by shaped charges set off by a control signal, as will be described. The rocket engine and its controls designated as a whole as J is mounted centrally in the aft end of the airframe as is conventional.

Throughout the specification the term "engine" refers to the combustion chamber including the exhaust nozzle, propellant injection means, etc., while the term "powerplant" refers to the missile as a whole including the engine, the tankage, conduits, controls, etc.

BASIC FORM OF ACORN ROCKET ENGINE

Figure 6:
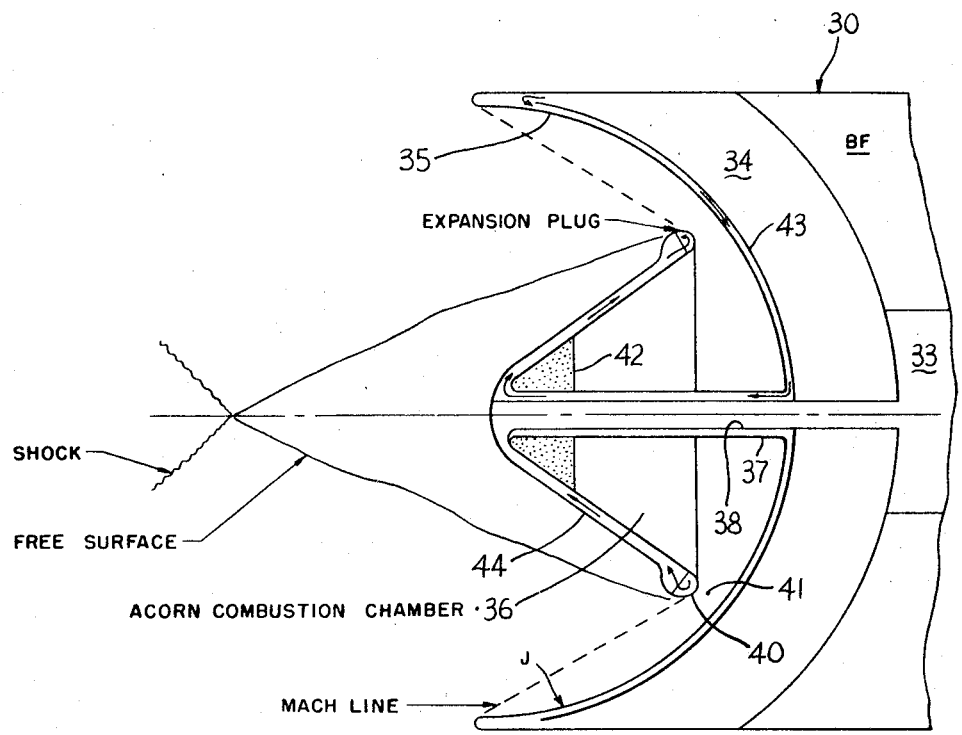
FIG. 6 is a schematic, fragmentary, central longitudinal sectional view of a fixed "acorn" thrust chamber and nozzle as used with bipropellants.

A basic form of the novel rocket engine of the present invention is disclosed in FIG. 6 in which numerals 33 and 34 designate pressurized oxidizer and fuel tanks of the powerplant respectively, the rear wall 35 of the latter being contoured in shape, and in this particular embodiment, substantially hemispherical. Oxidizer and fuel are delivered to the conical or "acorn" thrust chamber 36 by concentric manifolds 37, 38 on which it is rigidly mounted. The rim of its large open end 40 is spaced from but adjacent the concave surface of the aft wall 35 of the fuel tank 34 so as to define an annular exhaust passage or nozzle throat 41 therewith.

The fuel in passing to the injection orifices 42 of the combustion and thrust chamber is directed along the rear hemispherical wall 35 by a conforming baffle 43 so as to regeneratively cool this exhaust gas deflecting surface. Similarly, oxidizer and fuel regeneratively cool the acorn thrust chamber 36 by means of a compartmented coolant jacket 44 before separately reaching the injection orifices 42. The fuel and oxidizer, being hypergolic, require no ignition and mix and burn in the thrust chamber, the gases passing around the open end 40 through the annular nozzle throat 41 and back along the deflecting wall 35, expanding and providing thrust.

It is to be noted that the arrangement just described enables the volume of the missile normally occupied by the combustion chamber to be available for propellant loading, thus effecting an increase in mass ratio for the missile. The use of the aft tank head or wall 35 for the deflection portion of the nozzle also increases the structural efficiency of the airframe so that the tank head serves a dual purpose.

BASIC ACORN ENGINE WITH MECHANICAL THRUST VECTOR CONTROL

Figure 9:
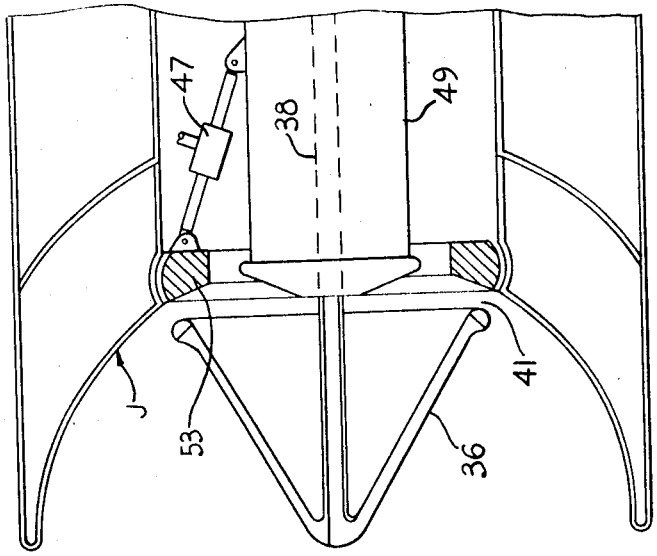
FIG. 9 is a view similar to FIG. 7 showing a modified form of vector control means.
Figure 7:
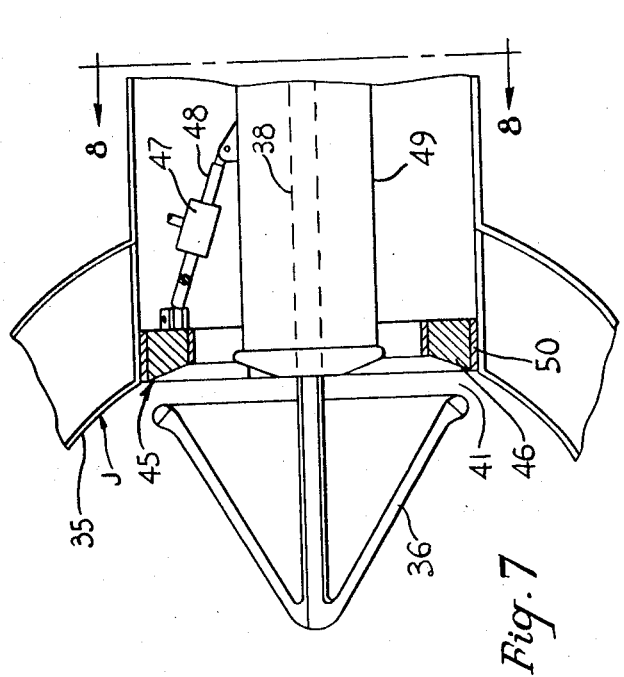
FIG. 7 is a similar view showing the acorn thrust chamber provided with one form of mechanical means for effecting thrust vector control.
Figure 8:
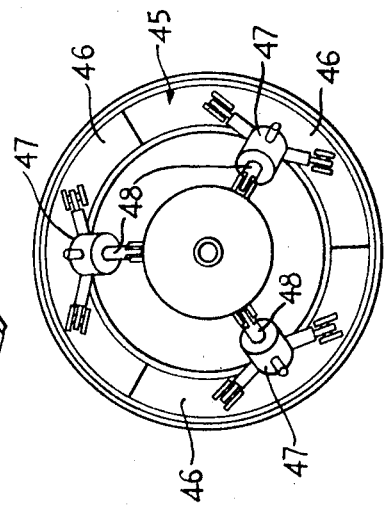
FIG. 8 is an aft end view of the vector control sectors of FIG. 7.

The basic acorn engine J of FIG. 6 is readily modified for thrust vector control with mechanical actuating means as shown schematically and in section in FIGS. 7–9 inclusive. The aft fuel tank wall 35 is modified to receive a ring 45 whose aft face is flush, i.e., providing uniform peripheral distribution of throat area, with the surface of the deflecting wall 35 except during those periods when a thrust vector direction other than axial of the motor is desired.

The ring 45 comprises three equal, arcuate sectors 46 to each of which one or more fluid pressure, extensible cylinders 47 are pivotally connected by V-shaped legs 48 at one end and to the central propellant conduit 49 at their other ends. The sectors 46 move in guides 50 to prevent their cocking which is also prevented by the V-shaped legs 48.

When thrust vector control is desired, fluid pressure is introduced into one or more of the cylinders 47 to move one or more of the sectors 46 into the throat area 41 to vary it and cause local disturbance to effect the vector control. Similar control is effected by the means disclosed in FIG. 9 which differs from FIGS. 7 and 8 only in that a single complete ring 53 is used instead of the sectors 46.

It will be appreciated that the arrangements of FIGS. 7–9 inclusive embodies a number of advantages in thrust vector control in that pivoting of the acorn is not required so that there is no resultant axial load which must be coped with, nor need for pivotal propellant lines. Moreover, the central conduit 49 permits efficient hydraulic actuation design.

As indicated above, the requirement for thrust vector control normally requires that the combustion chamber of a rocket engine be swiveled or gimballed, or, as illustrated, that auxiliary devices be used to effect jet deflection. The acorn thrust chamber, as shown in FIG. 10, embodies another new and unique mechanical way of obtaining thrust vector control by providing the concentric fuel and oxidizer manifolds 37, 38 which support the acorn 36 with a ball joint 54 which permits swiveling of the acorn thrust or combustion chamber at, or near, its center of gravity as indicated in the dotted lines. A suitable joint seal and a flexible diaphragm 55 prevent leakage or premature mixing of the propellants which pass through the ball joint 54 and enter the cooling jacket 44 as earlier described.

The mounting of the acorn 36 at or near its center of gravity enables the minimizing of the effect of inertial loads during its maneuvering to also enable a minimization of actuating force. As shown in dotted lines in FIG. 10, the acorn 36 is deflected by one of three fluid actuators 56 spaced 120° apart so that the proportion of thrust generated in the upper portion is appreciably greater than that in the lower portion. A clockwise turning (Yawing) movement is therefore generated due to the asymmetric thrust generation.

BASIC ACORN ENGINE WITH THRUST CONTROL

Figure 11:
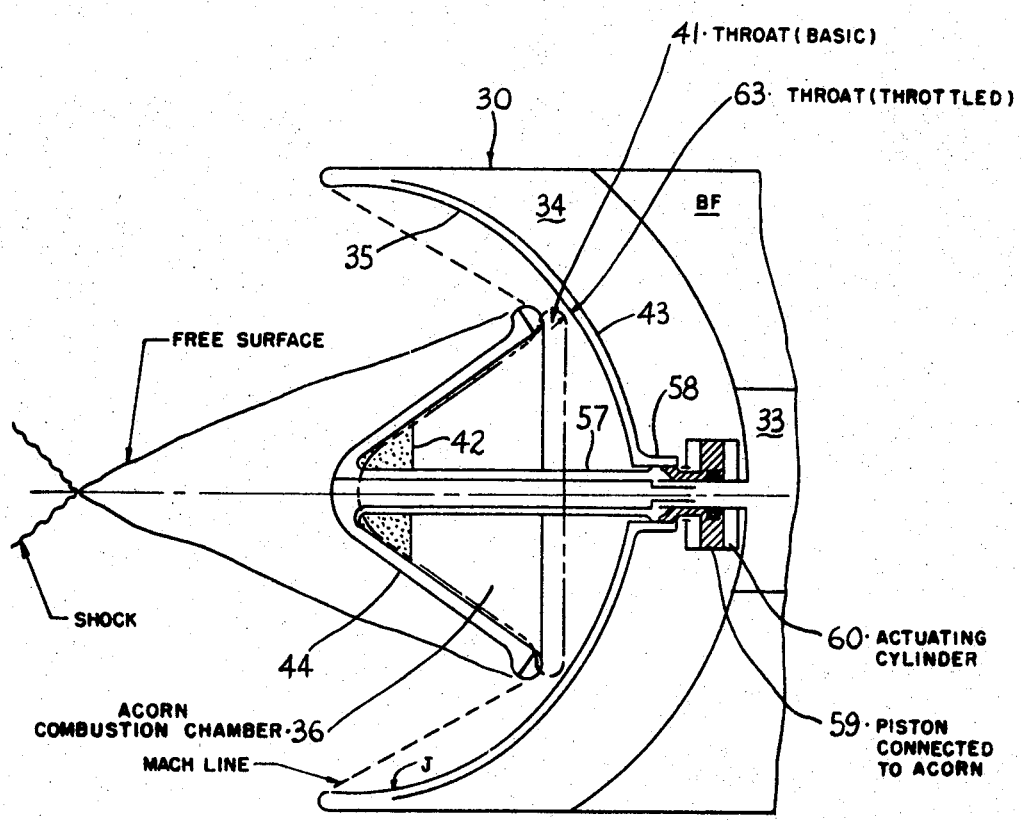
FIG. 11 is a view similar to FIG. 6 but showing the acorn thrust chamber mounted for axial movement by fluid power means to vary the throat area and hence the thrust of the powerplant.

As illustrated in FIG. 11, the thrust of the engine J may be readily varied by mounting the acorn 36 on extensible, concentric manifolds 57 which slide in suitably sealed housing 58 and are connected to a piston 59 in a fluid pressure actuating cylinder 60. Actuation, as demanded by a control system, will linearly translate the acorn chamber 36 along the fore and aft axis to vary the throat area 41 and throttle it as shown at 63 and thus change the thrust of the engine. As the throat area 41 is decreased the expansion area ratio increases which is desirable for high performance of the sustainer at extreme altitudes.

BASIC ACORN ENGINE WITH THRUST AND MECHANICAL VECTOR CONTROL

Figure 11A:
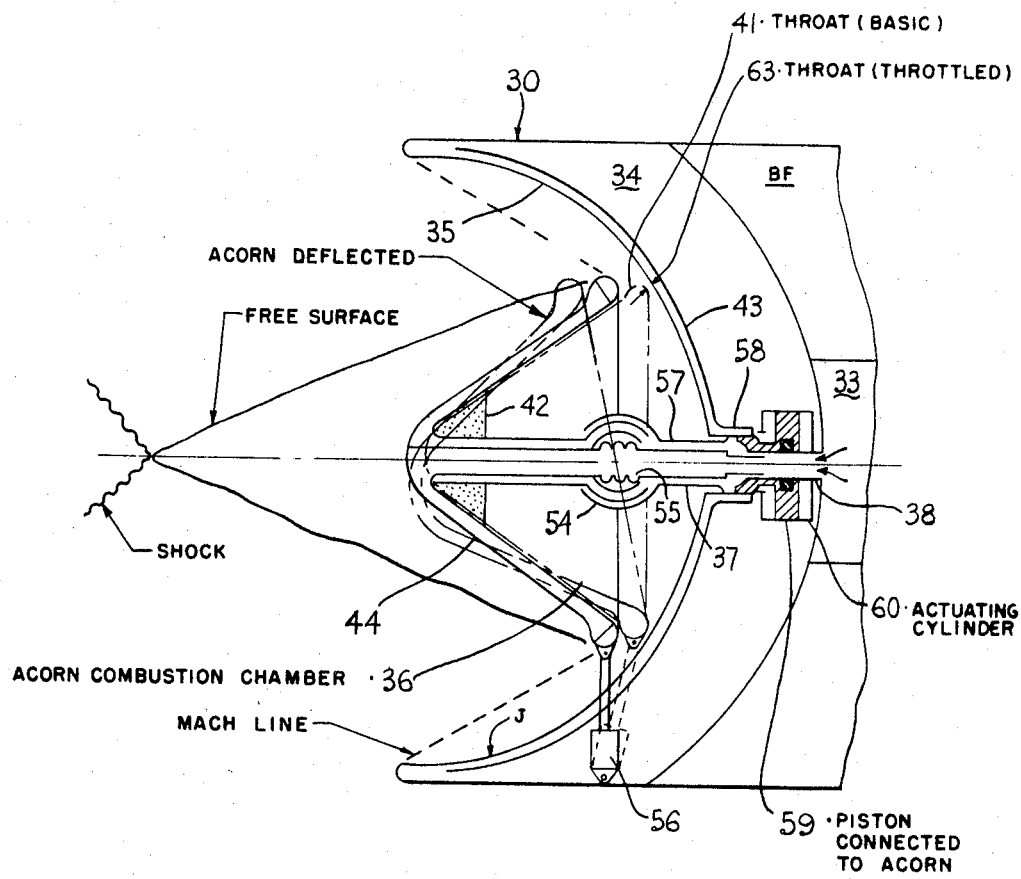
FIG. 11A is a view similar to FIG. 6 but showing the acorn chamber swively mounted to mechanically vary the thrust vector, and for axial movement.

A combination of mechanically actuated thrust vector control and throttling or thrust control is disclosed in FIG. 11A, which as indicated by similar numerals for similar parts, is a combination of the disclosures of FIGS. 10 and 11. As is apparent, the acorn thrust chamber 36 is mounted on the manifold's ball joint pivot 54 which receives propellants from the slidable, extensible, concentric manifold 57. Thus, the acorn 36 is free to pivot about the pivot point and to move fore and aft within the limits of the extensible manifolds.

It is to be noted that the same combination of pivoting and axial movement is disclosed in the preferred form of the invention (shown in detail in FIG. 4), the distinction being that thrust vector control is effected aerodynamically.

ACORN ENGINE WITH AERODYNAMIC THRUST VECTOR CONTROL

An acorn thrust chamber which employs aerodynamic actuation for thrust vector control is disclosed in FIGS. 12–16 inclusive. The acorn 36 as shown therein includes a compound exhaust plug nozzle 64 at its apex through which combustion gases are bled rearwardly around the partially internally expanded plug 65 which has a plurality of equally angularly spaced control gas passages 66 each individually controlled by a valve 67. As suggested in FIG. 13, the acorn 36 may include an outer manifold 68 for the injection of a diluent through apertures 69 for the purpose of cooling the hot gas passing through nozzle 64.

With the arrangement just described, it is possible to induce varied and eccentric forces at the apex or aft end of the acorn 36 which produce a moment about the ball joint 54 to cause the acorn to rotate or pivot to the desired position for asymmetric thrust generation. As seen in FIGS. 12 and particularly 15, the thrust producing fluid (combustion gases bled rearwardly through the nozzle 64) normally flows about the central plug 65 in isentropic flow and the thrust F produced is axial or along the central line of the plug.

When an asymmetric thrust force is desired, a secondary mass in the form of control fluid (i.e., gas or liquid such as inert control gas, combustion gas liquid propellant or other liquid) is injected through one of the control passages 66 as shown in FIG. 16. The addition of this secondary mass forces a local portion of the bled exhaust gases to be locally deflected away from the central plug 65. The combustion gases bled through the acorn apex now take an overall slightly different direction of flow. As a result, a local thrust component other than axial is produced and a force tending to rotate the nozzle about the ball joint 54 is produced.

The losses associated with this vector control system are minimized since only small actuation and control forces are needed.

SOLID PROPELLANT ACORN ENGINE

The acorn engine may employ a solid propellant (FIG. 17) which is molded into a monolithic-type acorn thrust chamber 70 coated with an ablative material and mounted on a central supporting manifold 73 extending from a hemispherical deflecting surface 71 and provided with an igniter 74 and an initiator 75. The nozzle or deflecting surface 71 is also lined with an ablative material 76.

It will be apparent that the throttling and thrust vector control means of FIGS. 10 and 11 as well as the vector control mechanism of FIGS. 12–16 inclusive are applicable to the solid propellant form shown. From a practical aspect, this solid propellant form will be very useful for low or moderate total impulse levels at high expansion area ratios.

HYBRID ACORN ENGINE

As shown in FIG. 18, a liquid propellant may be fed through the supporting manifold 73 from a tank 77 which is pressurized by solid grain 78 ignitable by a squib 79. The liquid propellant is injected into the solid propellant grain in the acorn thrust chamber 70 through orifices 80 and the quantity of liquid propellant injected is controlled by a throttling valve 83 to further control the performance of the unit.

It will be apparent that the throttling and thrust vector control means of FIGS. 10 and 11 as well as the vector control mechanism of FIGS. 12–16 inclusive are applicable to this hybrid acorn engine.

MONOPROPELLANT ACORN ENGINE

A further embodiment of the acorn engine is disclosed in FIG. 19 wherein a liquid monopropellant is introduced into the acorn chamber supporting manifold 84 from a tank 85 and injected through orifices 86 at the aft end of the acorn thrust (decomposition) chamber 87 into and through a catalyst bed 88. Upon decomposition, the gases pass through the nozzle throat 89 and expand along the deflecting surface 90 of the tank 85 and around the acorn chamber 87.

This form of the acorn engine J exploits the reverse flow of the combustion gases and the acceleration of the powerplant and missile to improve the decomposition and/or combustion of the monopropellant. The acceleration of the powerplant will result in keeping the liquid monopropellant within the catalyst bed 88 until it thoroughly decomposes and develops sufficient pressure to force the gaseous decomposition products through the nozzle throat 89.

As a result, a smaller catalyst bed is required and there is less danger of flooding. This in turn effects more efficient decomposition and gives inherent geometry and pressure drop advantages in that the largest flow area is at the position corresponding to the highest gas temperature and highest gas specific volume. Also, the throttling and thrust vector control means of FIGS. 10 and 11 are applicable to this form of engine.

PREFERRED FORM OF ACORN POWERPLANT AND MISSILE

The preferred form of the acorn powerplant 30 is shown in FIGS. 1–5 inclusive and enlarged details thereof in FIGS. 20–25 inclusive. As disclosed, the acorn engine J embodies the throttling and aerodynamic thrust vector control means already described and to be described further and utilizes liquid propellants such as nitrogen tetroxide oxidizer and unsymmetrical dimethyl hydrazine fuel pressurized by the low-temperature, solid propellant gas generator P to be described.

PREFERRED FORM OF ACORN ENGINE AND MOUNTING

As seen in FIG. 4, an acorn thrust chamber 100 is mounted on concentric fuel and oxidizer manifolds 103, 104 so that its rim 105 is adjacent but spaced from the concave surface of the aft wall 106 of the sustainer fuel tank SF to define the throat 107 of the acorn tank head exhaust nozzle formed by the deflecting wall 106 and the acorn 100. The fuel and oxidizer, which are hypergolic and used separately to regeneratively cool the compartmented wall of the acorn, are maintained separate until injected under pressure within the acorn for combustion through separate spaced orifices such as 108.

BALANCED ACORN THRUST CHAMBER PIVOT

The concentric acorn supporting manifolds 103, 104 permit pivoting of the acorn for thrust vector control by the inclusion of a ball joint pivot having inner and outer mating ball portions 109, 110 which are properly sealed against fuel leakage, the adjacent ball joint ends of the oxidizer manifold being connected by a flexible conduit 113.

The pivoting of the acorn chamber 100 exerts large forces at the ball joint 110 and involves appreciable amounts of friction which requires actuation forces of comparable size. A feature of the invention resides in providing a balanced ball joint to minimize these forces. This is accomplished by forming an annular chamber 114 in the inner hemispherical surface of the outer ball portion 110 to which a high-pressure hydraulic fluid is delivered by means of a connecting conduit 115. When introduced into the chamber 114, the pressure fluid lifts the outer ball portion 110 away from the inner portion 109 allowing the former to "float" on the high-pressure hydraulic fluid.

The high pressure of the hydraulic fluid is obtained by materially amplifying the pressure of the propellant tanks after the packaged powerplant has been activated, as illustrated in FIG. 5. A differential area piston having a large head 116 and a small head 117 is mounted in a cylinder 118 and the hydraulic fluid to be pressurized is confined in a small portion of the cylinder 118 and in the conduit 115 by a pair of frangible metallic burst discs 119, one of which is shown adjacent the small piston head 117.

When the powerplant is activated, the pressurized fuel ruptures a burst disc 123 and is admitted to the cylinder 118 through a conduit 120 (FIGS. 3 and 5) to act against the large piston head 116 to provide a highly amplified pressure in the small portion of the cylinder 118 as compared to the pressure of the propellant tanks. The metallic discs 119 are sheared and the high-pressure hydraulic fluid effects the "floating" of the outer ball joint portion 110 on the inner portion 109 to provide a balanced pivot for the acorn thrust chamber.

ACORN ENGINE THRUST CONTROL

The fuel manifold 103, forward of the ball joint 110, is keyed to a piston 124 which is slidable in a cylinder 125 and is so formed as to define a small "retraction" chamber 126 with the aft head 127 of the cylinder 125, and a larger chamber 128 in which a second solid propellant gas generator 129 is mounted and communicates with the retraction chamber by a passage 130.

Upon the conclusion of boost operation, the reduced burning area of the pressurization grain 155 causes a drop in pressure which initiates a signal to start burning of the grain in the gas generator 129. Pressurized gases then flow through the passage 130 into the retraction chamber 126. Pressure builds up rapidly and effects movement of the piston 124 and the acorn supporting manifolds 103, 104 forwardly to the sustain phase position to be described and as indicated by the dotted lines in FIG. 4.

It will be appreciated that the forward axial translation of the concentric manifolds also moves the acorn thrust chamber 100 forwardly to throttling position adjacent the tank head nozzle or deflecting surface 106 by reducing the nozzle throat 107.

PROPELLANT FLOW CONTROL

Referring to FIGS. 1, 4 and particularly 24, it will be seen that the forward ends of the manifolds 103, 104 which are provided with flow restrictors or venturi nozzles 133 and lateral ports 134, are slidably mounted in the aft end of fixed valve housings 135 and 136 which directly communicate respectively with the sustain oxidizer tank SO and the sustain fuel tank SF, the direction of flow therefrom being as indicated by the arrows.

As the valves in the housings 135 and 136 are identical, only the former will be described. Prior to pressurization of the tankage by the solid propellant grain generator PG, flow through the housing is prevented by a hermetically sealed unbalanced butterfly valve 137 which is scored so as to be ruptured and pivot to open position about its shaft 138 by the oxidizer when pressurized.

The housing is provided with an annular shoulder 139 having a seal 140 so as to seal off flow of oxidizer through the lateral ports 134 when the manifolds move to the dotted line or sustain flow position against the shoulder 139. A poppet valve housing 143 is mounted in the valve housing 135 by a spider and a poppet valve 144 is spring urged toward a seat against the restrictor 133 when in sustain position but is held spaced therefrom by a spring urged detent 145 mounted on a piston 146 in a cylinder 147.

When the propellants are pressurized for boost operation, their pressure opens the unbalanced butterfly valves 137 and flow is past the poppet valves 144 and through the restrictors 133 and the lateral ports 134, the manifolds 103 and 104 being in the solid line position shown. Upon conclusion of boost operation, the manifolds move forwardly as earlier described to the dotted line position shown against the seals 140 of the valve housing shoulders 139 and seal off the lateral ports 134 so that propellant flow is only through the restrictors and is thus throttled simultaneously with throttling movement of the acorn thrust chamber 100. When it is desired to terminate the flow of propellants, a squib 148 is ignited so that pressure gases are conducted to the detent cylinders 147 above the piston 146 by a conduit 149 to retract the pins 145 to permit the spring pressed poppet valves 144 to seat against the restrictors 133.

It is to be noted that each of the propellant flow control means described incorporates three features: that of being hermetically sealed with activation initiated by increasing upstream pressure; throttling from a high rate of flow to a lower rate or the reverse if desired; and release of the poppet valve by squib actuation. Infinite throttling over the entire flow range may be provided with only slight modification.

SOLID GRAIN PRESSURIZATION SYSTEM

The solid grain pressurization system when ignited performs the important functions of: rupturing the hermetic sealing bands in the booster oxidizer or fuel tanks and pressurizing the booster and sustain propellants successively by the use of novel automatic valves; rupturing the hermetic sealing bands of the butterfly valves 137 to initiate flow of the propellants; providing roll control; and providing a control fluid for the oblique shock, roll, and thrust vector control.

The gas generating chamber PG (FIGS. 1, 1A, 2, 3 and 23) includes an initiator 153 having a squib igniter 154 for the solid pressurization grain 155 which is integrally formed with two sharply differing diameters of burning area as shown in FIG. 23. The larger area adjacent the initiator is for boost phase and the smaller for sustain phase operation.

Communication between the pressure gas generating chamber PG and the propellant tankage is controlled by a pair of valves 156 and 157 shown in detail in FIG. 23, and being identical in construction, only one will be described. Each valve has an inlet port sealed by a burst disc 158, a tapered valve seat 159, a tapered valve 160 held in open position against a stop 163 by the engagement of a part 163 of the boost fuel tank BF with the valve stem 164. In the position shown, the pressure of the gases will burst the disc 158 and they will pass around the valve bypass ducts 165 past the seat 159 and directly into the boost fuel tank BF to pressurize the same. The boost oxidizer tank BO is similarly pressurized.

At the conclusion of boost phase operation and upon signal, shaped charges to be described are actuated which cut off the booster oxidizer and boost fuel tanks BO, BF so that not engaging the valve stems 164, they no longer hold the valves 156, 157 against their stops 163. As a result, the gas pressures acting against the base or head of the tapered valves 160 moves them to their tapered seats 159 sealing off the direct flow of pressurizing gases into the ports formerly directly communicating with the booster oxidizer fuel tanks.

In moving to their seats, the valves uncover a lateral port 166 which in the case of valve 156 opens communication with the sustain fuel tank SF by conduit 167 and in the case of the valve 157 opens direct communication with the sustain oxidizer tank SO, so that both tanks are pressurized for sustain phase operation.

Figure 3:
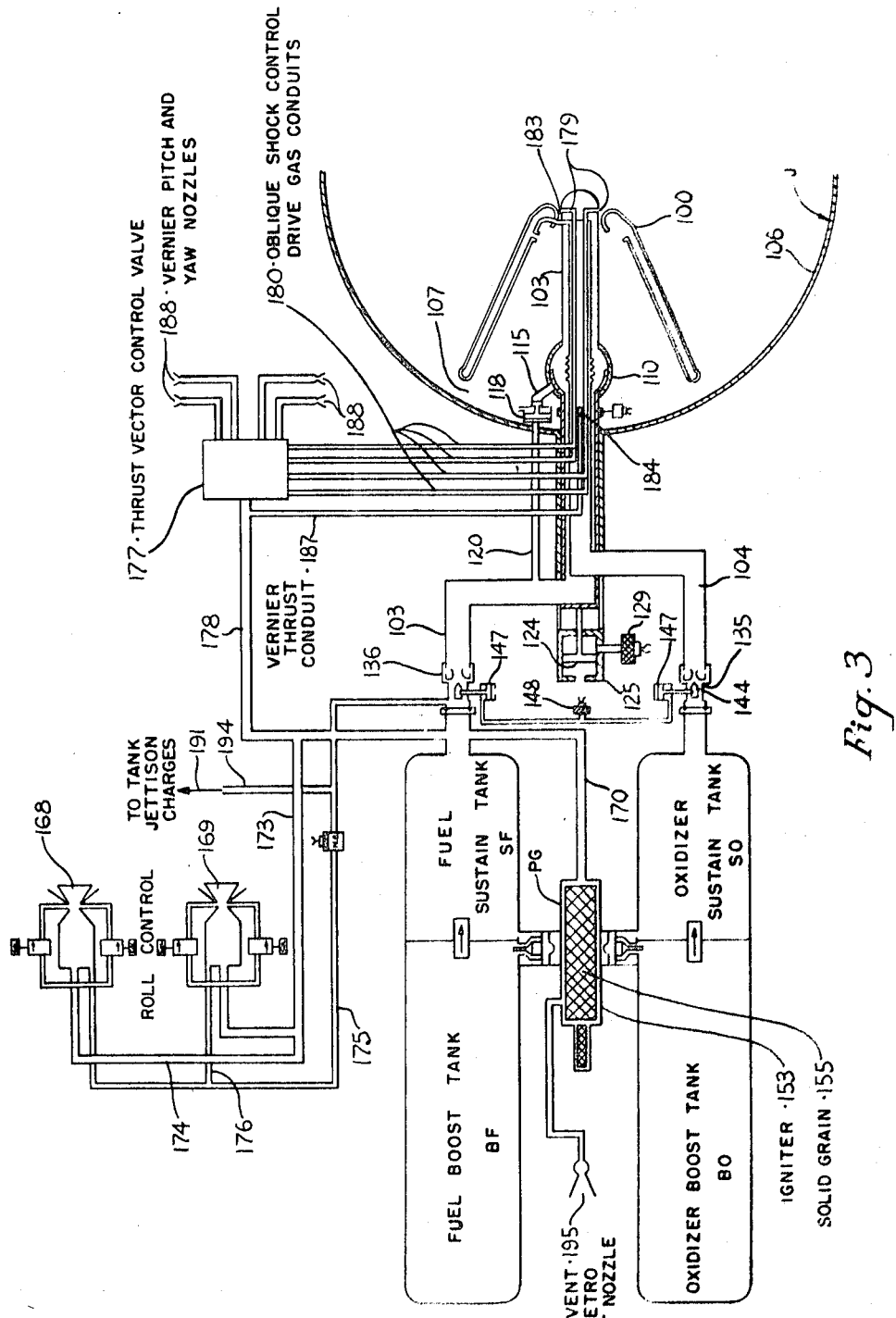
FIG. 3 is a schematic view of the preferred form of the novel rocket powerplant showing the propellant, pressurizing, and control connections.

The rupturing and opening of the unbalanced butterfly valves upon pressurization of the booster oxidizer and fuel tanks is indicated in FIG. 3 and, of course, has been described in connection with FIG. 4. As shown in FIGS. 1 and 3, fluid pressure gases are delivered from the gas generating chamber PG to the pair of roll control jet nozzles 168, 169 by conduits 170, 173, and 174. During boost phase operation, fuel is fed from the conduit 103 to the roll control chambers and jets by way of conduits 175, 176 to provide the additional thrust needed during boost phase operation.

As is clearly seen in FIG. 3, pressurizing gas from the generator PG is also delivered to a thrust vector control valve 177 by conduits 170 and 178 from which the oblique shock control gas is selectively directed to the nozzles 179 (FIG. 4) by four conduits 180 to deflect the gases being bled rearwardly through the cone passages 183 of the acorn thrust chamber 100, all as explained in connection with FIGS. 12-16 inclusive.

Figure 1A:
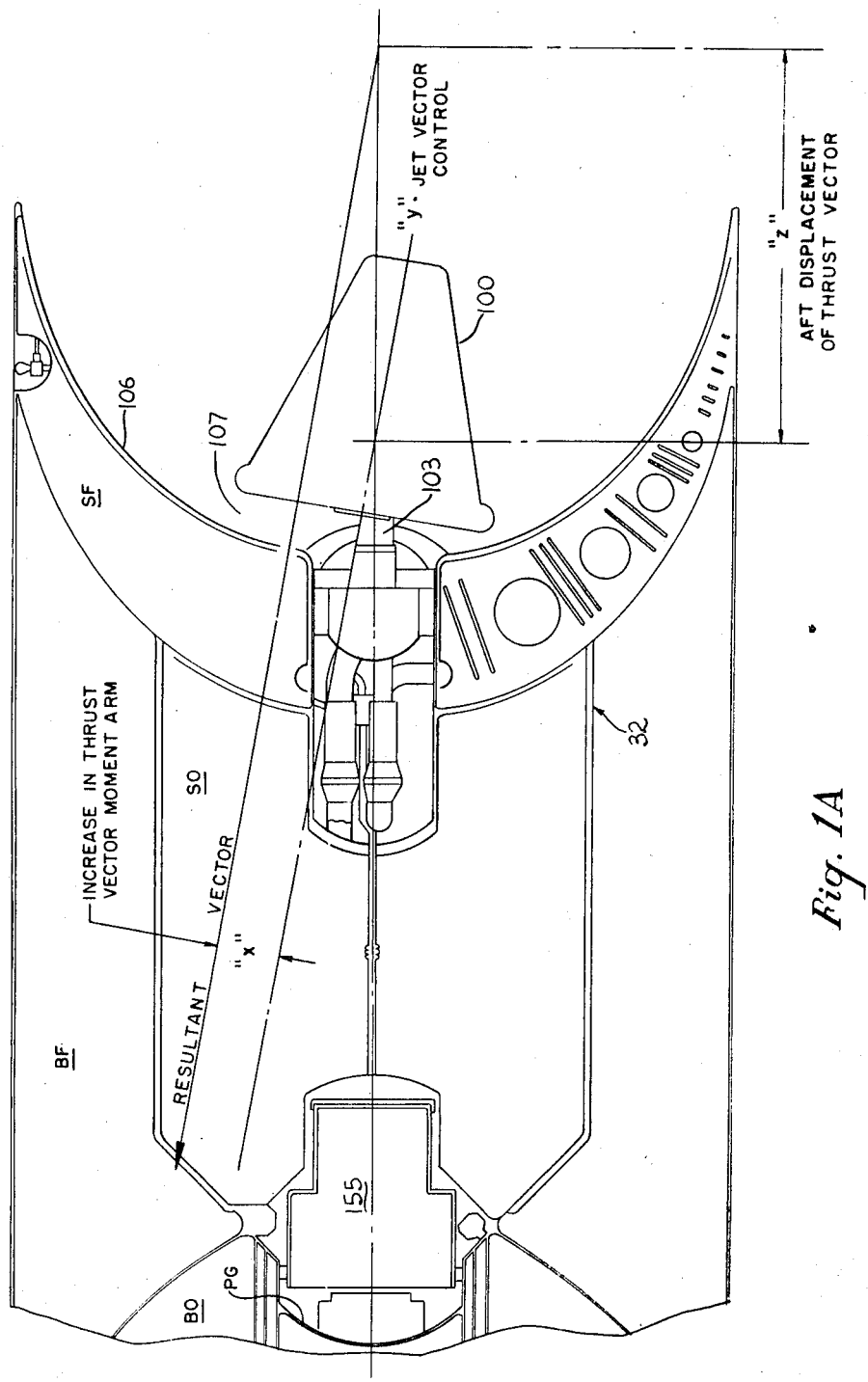
FIG. 1A is a similar fragmentary view showing the amplified thrust vector effect when the acorn thrust chamber is tilted.

As illustrated in FIG. 1A, the effective line of action of the thrust vector y is not only rotated but is translated away from the acorn pivot 110 to result in amplification of the vector which increases the moment available for vehicle control purposes. That this amplification is substantial is indicated by the increase in thrust vector moment arm x and in the aft displacement of the thrust vector z.

A vernier thrust nozzle 184 (see FIG. 4) is mounted centrally within the oxidizer manifold 104 and the shock gas conduits 180 and is provided with a scored and separable cover portion 185 which breaks off and is jettisoned with the acorn thrust chamber 100 upon explosion of the jettison charge 186 when ignited upon signal from the guidance system (FIG. 25). Jettisoning of the acorn chamber, of course, eliminates the need for a combustion chamber purge system.

The vernier thrust nozzle 184 is supplied with pressurized gases from the generator PG by the conduits 170, 178, and 187 and when the cover portion 185 is removed upon jettisoning, the nozzle 184 functions as a vent to prevent over-pressurization of the propellant tankage and also provides vernier thrust for attaining precisely the required missile velocity. Directional control during vernier thrusting is provided by directing solid pressurization gas from the vector control valve 177 to small nozzles 188 arranged with angularity to the axis of the powerplant and missile 30 (FIGS. 1, 2, and 3).

Figure 2:
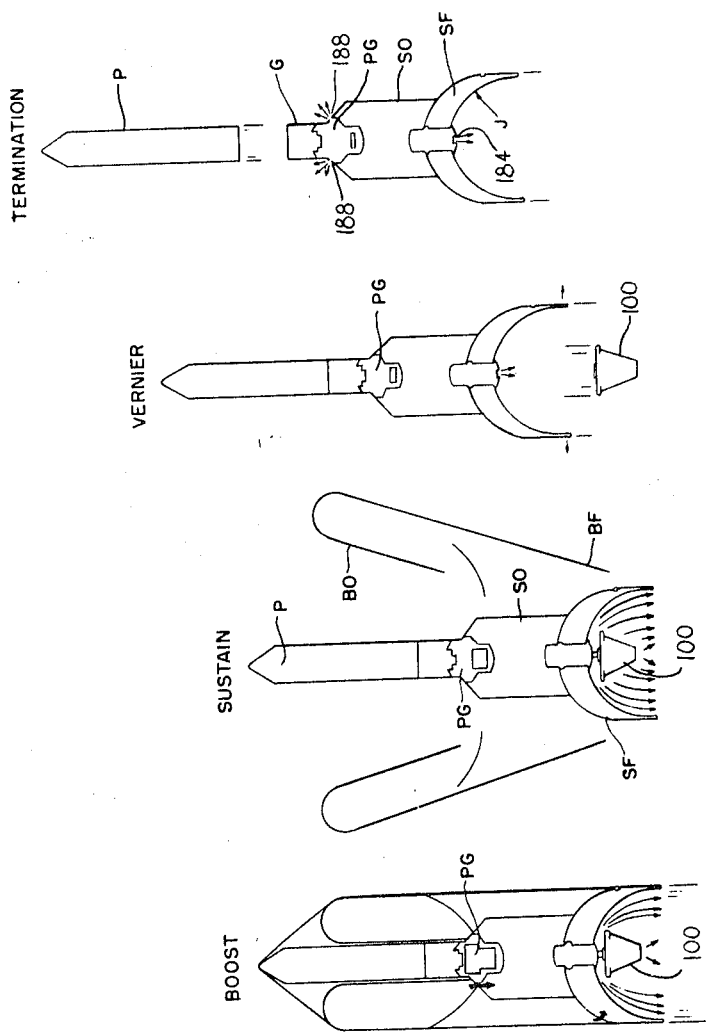
FIG. 2 is a schematic view to a reduced scale showing the several stages of operation of the invention.

As disclosed in FIGS. 1 and 2, the boost oxidizer tank BO is annular and adjacent its inner wall is provided with an annular baffle 190 to conduct the pressurizing gases from the generator PG to the forward end of the tank. The boost fuel tank is likewise annular in shape and at strategic points along their connection with the airframe 32 and between each other, liquid fueled shaped charge destruct and separation devices 191 are placed. These are so arranged upon activation and ignition as to cleanly separate the booster fuel and oxidizer tanks from each other and from the airframe 32 in sectors and permit the valves 156 and 157 to shut off pressurizing gases to the boost tanks and admit them to the sustainer tanks.

Liquid fuel is bled into the shaped charge destruct and separation devices 191 from conduits 103, 175 and 194 where it is activated (i.e., modified to a detonable compound) and it is thus to be noted that these devices are therefore not armed until activation (ignition) of the powerplant 30.

Three or more symmetrically positioned retrothrust nozzles 196 (FIG. 1) are positioned at the forward end of the sustain oxidizer tank SO to provide axial thrust to slow down the powerplant and missile 30 to permit the payload P to pursue its ballistic trajectory while the powerplant drops away.

The retronozzles 196 are sealed with burst discs 197 adapted to be burst by a fired powder charge 198 upon a signal from the guidance equipment G which is delivered when the desired velocity change is achieved by thrusting from the vernier nozzle 184 located within the hot gas lines 180 to the thrust vector control nozzles 179. The thrust delivered from the retronozzles 196 is obtained from the pressurized gas remaining in the oxidizer sustainer tank after completion of the sustain phase.

In FIG. 25 is shown the safety destruct system which comprises a group of three identical electromechanical circuits independently or collectively operated on signal from guidance system G at the appropriate times to jettison the acorn, jettison tanks and to burst the retrorocket burst discs, the latter being accomplished in the manner just described in the preceding paragraph. The tank jettison system is typical of all of the jettisoning systems and is shown schematically inside the broken lines. The electrical signal from the guidance system G passes into solenoid switch 200 energizing its coil and causing the switch to close. Current then flows from battery 201 through the closed contacts of the switch to solenoid valve 202 which opens. Current also flows from the switch 200 through a time delay 203 to initiator 204 which then fires after the time-delay period has expired. Since valve 202 will have operated in the interim, hot gases from initiator 204 will immediately pass directly into the shaped charge thus igniting it. The force of the burning shaped charge then causes separation of the structure which it faces and jettisoning occurs.

OPERATION

The operation of the powerplant will be described in connection with the use of the preferred form of the pocket engine J as illustrated specifically in FIGS. 1 to 5 inclusive and it will be understood that the other forms of the rocket engine as shown in FIGS. 6 to 12 inclusive may be used instead as limited by the nature of the embodiment.

The significant phases of the powerplant operation are pictorially illustrated in FIG. 2.

The powerplant is armed by the insertion of exploding bridge wire initiator 154 for the solid propellant pressurization grain and the insertion of similar initiators for the booster tank jettison system and for the safety destruct system.

The powerplant 30 is started by igniting the solid propellant pressurization grain 155 by the squib 153 and initiator 154 to generate the pressure gases in the chamber PG. As the pressure of the gases builds up, the burst discs 158 are ruptured and the booster oxidizer and fuel tanks BO and BF are pressurized; hot pressure gases are conducted to the roll jets 168 and 169, for low-level roll control; hot pressure gas goes to the thrust vector control valve 177 to provide a control fluid for oblique shock control of the thrust vector (acorn positioning) jet; the pressurized propellants shear the unbalanced, hermetically sealed butterfly valves 137 to initiate the booster phase flow of propellants which flow through the manifolds 103 and 104, the pivot 110, and through the injection orifices 108 into the acorn thrust chamber 100 where they ignite hypergolically to provide boost phase thrust.

Upon flow of the propellants, liquid fuel is bled from the downstream side of the fuel valve 137 to supplement the solid propellant gases to provide the additional roll control thrust at the jets 168, 169 needed during boost operation. Liquid fuel is also bled into the shaped charge destruct and separation devices to arm them as detonable compounds. During this booster phase of operation, the roll control jets 168, 169 act as a vent for the solid propellant gases and keep the tanks BO and BF at the correct pressure.

As set forth in detail herein, during boost phase thrust, thrust vectoring is achieved by swiveling the acorn thrust chamber 100 about the ball joint 110 which is at or just forward of the center of gravity of the chamber. Some of the thrust chamber combustion gases are bled through the nozzle orifices 183 at the aft end of the chamber 100 to provide thrust for swiveling the chamber 100. The direction of the bleed gas is controlled, as explained, by the oblique shock technique using the solid propellant grain gas as the control fluid to deflect the combustion gases by oblique shock to control the position of the rotatable or pivotal acorn 100 and thus provide main propulsion thrust vector control.

Boost thrust continues until the boost oxidizer and fuel tanks BO and BF are empty and the rocket engine operates several seconds on the propellants from the sustain oxidizer and fuel tanks SO and SF. The larger area of the solid pressurization grain 155 also burns several seconds after the booster tanks are empty at which time it ignites the smaller area of the grain. As the burning area of the grain changes abruptly for sustain operation, the drop in generated gas pressure actuates a pressure switch which initiates a control signal.

The control signal initiates the shaped charge booster tank jettison device and the booster oxidizer and fuel tanks BO BF are jettisoned. This permits operation of the automatic valves 156, 157 (FIGS. 1 and 23) to admit pressurizing gases to the sustain oxidizer and fuel tanks SO and SF. The signal also activates the solid propellant gas generator 129 to direct the resultant generated gases to the retraction chamber 126 to effect the forward movement and throttling of the acorn thrust chamber 100 to the sustain phase position.

At this time, while the pressure gases from the generator PG still pass to the roll control jets 168, 169, the bleeding of liquid fuel thereto from the conduit 103 is terminated as this was bled downstream of the valve 137 from the conduit or valve housing 135 between the boost and sustain phase positions of the manifolds 103, 104 which is shut off by their movement to sustain position.

Sustain thrust continues until the powerplant and missile 30 approaches the required burnout velocity and position as predetermined by the amount of fuel and a timed flight period. Then, on signal from the guidance system G, the squib 148 is ignited to direct pressure gases to the detent cylinders 147 to withdraw the poppet valve holding pins 145 to permit the springs to close the propellant poppet valves 144. The guidance system signal simultaneously ignites the acorn chamber shaped charge jettison device 186 to jettison the acorn 100 by disconnecting the chamber manifold support above the joint 110 and opens the vernier thrust nozzle 184 to provide vernier thrust for attaining precisely the required powerplant velocity.

Directional control during vernier thrusting is provided by directing the solid pressurization gas from the generator chamber PG through the small nozzles 188 positioned normal to the axis of the powerplant 30, or by venting the gases through the oblique shock vector control line nozzles 179. The flow of solid pressurization gas to the roll control jets 168, 169 is continued.

When the final exact missile velocity and position are attained, the payload P is disconnected and released and the solid pressurization grain gases are vented through the nozzles 196 to apply a retrothrust to the powerplant to separate it and the payload.

It will now be apparent that the various features of the invention and combinations thereof all contribute to provide the advantages of: lower weight; shorter length; lower cost; and higher reliability over the conventional two-stage rocket approach.

It is to be understood that the forms of our invention herewith shown and described are to be taken as preferred example of the same and that various changes in the shape, size and arrangement of parts may be resorted to without departure from the spirit of the invention or the scope of the subjoined claims.

We claim:

1. A rocket engine comprising, in combination, a manifold for introducing propellants into a combustion chamber, a wall having a hemispherical deflecting surface fixed to an intermediate portion of said manifold and extending aft therearound, a conical combustion chamber fixed to and communicating with the aft end of said manifold and having its larger open end positioned adjacent but spaced from said surface to define an expansion exhaust nozzle and throat therewith, apertures formed in the apex of said chamber for bleeding combustion gases therethrough, and means for deflecting a portion of said gases to vary the thrust vector of said engine in operation.

2. A rocket engine as recited in claim 1 wherein said deflecting means comprises a source of gas pressure, plural conduits connecting said source and said apertures, and a valve selectively connecting one of said conduits with a portion of said apertures to deflect a portion of said gases.

3. A rocket engine as recited in claim 2 wherein said combustion chamber is pivotally mounted at substantially its center of gravity on said manifold and the deflection of a portion of said gases effects a pivoting of said chamber to vary the thrust vector of said engine.

4. A rocket engine as recited in claim 3 wherein the pivot of said chamber comprises a ball joint in said manifold aft of said surface.

5. A rocket engine as recited in claim 4, and means for delivering a fluid under high pressure to and between the mating parts of said ball joint to balance the pressures therebetween to permit frictionless pivoting of said chamber.

6. A rocket engine comprising a manifold for introducing propellants into a combustion chamber, a wall having a hemispherical deflecting surface fixed to an intermediate portion of said manifold and extending aft therearound, a substantially conical combustion chamber fixed to and communicating with the aft end of said manifold and having its larger open end positioned adjacent but spaced from said surface to define an expansion exhaust nozzle and throat therewith, and mechanical means connected with said manifold for varying the thrust vector of said engine in operation, said means comprising a circular slot formed in said wall surface adjacent and concentric with said manifold, a plurality of arcuate abutting segments slidably mounted in said slot flush with said surface, and actuator means connecting said manifold with each of said segments and separately operable to move a segment into the nozzle throat.

7. A rocket engine comprising a manifold for introducing propellants into a combustion chamber, a wall having a hemispherical deflecting surface fixed to an intermediate portion of said manifold and extending aft therearound, a substantially conical combustion chamber fixed to and communicating with the aft end of said manifold and having its larger open end positioned adjacent but spaced from said surface to define an expansion exhaust nozzle and throat therewith, and mechanical means connected with said manifold for varying the thrust vector of said engine in operation, said means comprising a circular slot formed in said wall surface adjacent and concentric with said manifold, a ring tiltably and slidably mounted in said slot flush with said surface, and a plurality of actuators connecting said manifold with circumferentially spaced points of said ring and separably operable to move said ring at a selected point into the nozzle throat.

8. A rocket engine comprising a manifold having an igniter therein, a hemispherical deflecting surface mounted adjacent the forward end of said manifold and extending aft therearound, a conical combustion chamber fixed to and communicating with the aft end of said manifold and having its larger open end positioned adjacent but spaced from said surface to define an expansion nozzle and throat therewith, a solid propellant molded in said chamber and ignitable by said igniter, and mechanical means connected with said manifold for varying the thrust vector of said engine in operation.

9. A rocket engine as recited in claim 8 wherein said means comprises a circular slot formed in said wall surface adjacent and concentric with said manifold, a plurality of arcuate abutting segments slidably mounted in said slot flush with said surface, and actuator means connecting said manifold with each of said segments and separately operable to move a segment into the nozzle throat.

10. A rocket engine as recited in claim 8 wherein said means comprises a circular slot formed in said wall surface adjacent and concentric with said manifold, a ring tiltably and slidably mounted in said slot flush with said surface and a plurality of actuators connecting said manifold with circumferentially spaced points of said ring and separably operable to move said ring at a selected point into the nozzle throat.

11. A rocket engine comprising a manifold having an igniter therein, a hemispherical deflecting surface mounted adjacent the forward end of said manifold and extending aft therearound, a conical combustion chamber fixed to and communicating with the aft end of said manifold and having its larger open end positioned adjacent but spaced from said surface to define an expansion nozzle and throat therewith, and a solid propellant molded in said chamber and ignitable by said igniter, said manifold being axially movable with respect to said surface to vary the throat area of said nozzle, and said manifold including means for permitting pivoting of said chamber at substantially its center of gravity to vary the thrust vector thereof.

12. A rocket engine comprising a manifold having an igniter therein, a hemispherical deflecting surface mounted adjacent the forward end of said manifold and extending aft therearound, a conical combustion chamber fixed to and communicating with the aft end of said manifold and having its larger open end positioned adjacent but spaced from said surface to define an expansion nozzle and throat therewith, and a solid propellant molded in said chamber and ignitable by said igniter, said manifold being axially movable with respect to said surface to vary the throat area of said nozzle.

13. A rocket engine as recited in claim 12, and actuator means connected with said manifold to effect axial movement thereof.

14. A rocket engine comprising a manifold for introducing a liquid propellant into a combustion chamber for combustion therein with a solid propellant, a wall having a hemispherical deflecting surface fixed to an intermediate portion of said manifold and extending aft therearound, a conical combustion chamber fixed to and communicating with the aft end of said manifold and having its larger open end positioned adjacent but spaced from said surface to define an expansion exhaust nozzle and throat therewith, a solid propellant molded in said chamber for combustion with said liquid propellant, and mechanical means connected with said manifold for varying the thrust vector of said engine in operation, said means comprising a circular slot formed in said wall surface adjacent and concentric with said manifold, a plurality of arcuate abutting segments slidably mounted in said slot flush with said surface, and actuator means connecting said manifold with each of said segments and separately operable to move a segment into the nozzle throat.

15. A rocket engine comprising a manifold for introducing a liquid propellant into a combustion chamber for combustion therein with a solid propellant, a wall having a hemispherical deflecting surface fixed to an intermediate portion of said manifold and extending aft therearound, a conical combustion chamber fixed to and communicating with the aft end of said manifold and having its larger open end positioned adjacent but spaced from said surface to define an expansion exhaust nozzle and throat therewith, a solid propellant molded in said chamber for combustion with said liquid propellant, and mechanical means connected with said manifold for varying the thrust vector of said engine in operation, said means comprising a circular slot formed in said wall surface adjacent and concentric with said manifold, a ring tiltably and slidably mounted in said slot flush with said surface, and a plurality of actuators connecting said manifold with circumferentially spaced points of said ring and separably operable to move said ring at a selected point into the nozzle throat.

16. A rocket engine comprising a manifold for introducing a monopropellant into a combustion chamber for decomposition therein by a catalyst, a hemispherical wall and deflecting surface fixed to an intermediate portion of said manifold and extending aft therearound, a conical decomposition and thrust chamber fixed to and communicating with the aft end of said manifold and having its larger open end positioned adjacent but spaced from said surface to define an expansion exhaust nozzle and throat therewith, a catalyst bed mounted in said chamber for the passage of decomposing monopropellant therethrough, and mechanical means connected with said manifold for varying the thrust vector of said engine in operation, said means comprising a circular slot formed in said wall surface adjacent and concentric with said manifold, a plurality of arcuate abutting segments slidably mounted in said slot flush with said surface, and actuator means connecting said manifold with each of said segments and separately operable to move a segment into the nozzle throat.

17. A rocket engine comprising a manifold for introducing a monopropellant into a combustion chamber for decomposition therein by a catalyst, a hemispherical wall and deflecting surface fixed to an intermediate portion of said manifold and extending aft therearound a conical decomposition and thrust chamber fixed to and communicating with the aft end of said manifold and having its larger open end positioned adjacent but spaced from said surface to define an expansion exhaust nozzle and throat therewith, a catalyst bed mounted in said chamber for the passage of decomposing monopropellant therethrough, and mechanical means connected with said manifold for varying the thrust vector of said engine in operation, said means comprising a circular slot formed in said wall surface adjacent and concentric with said manifold, a ring tiltably and slidably mounted in said slot flush with said surface, and a plurality of actuators connecting said manifold with circumferentially spaced points of said ring and separably operable to move said ring at a selected point into the nozzle throat.

* * * * *